July 10, 1934.   J. ROBINSON   1,965,909
AUTOMATIC TRAIN PIPE CONNECTER
Original Filed Nov. 2, 1929   2 Sheets-Sheet 1

INVENTOR
Joseph Robinson,
BY
Watson, Coit, Morse & Grindle
ATTORNEY

July 10, 1934.  J. ROBINSON  1,965,909
AUTOMATIC TRAIN PIPE CONNECTER
Original Filed Nov. 2, 1929  2 Sheets-Sheet 2
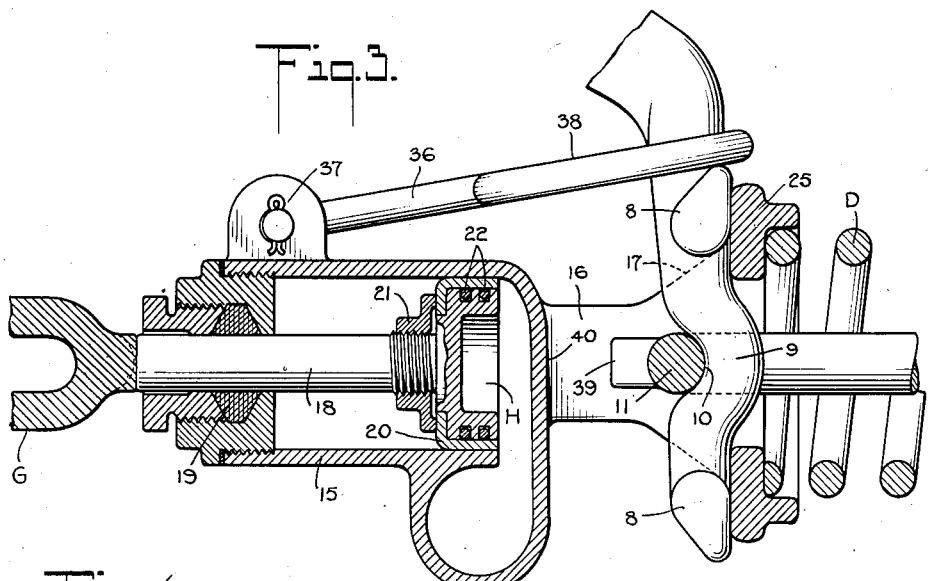
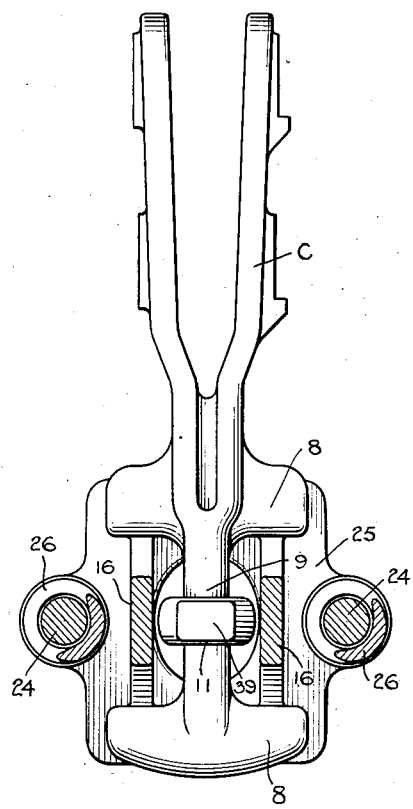
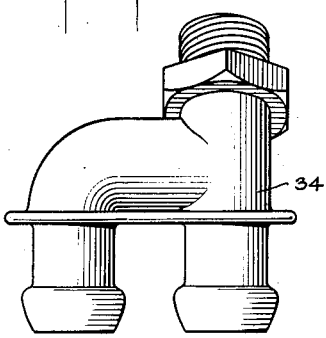
INVENTOR
Joseph Robinson,
BY
Watson, Coit, Morse & Grindle
ATTORNEY Patented July 10, 1934

1,965,909

UNITED STATES PATENT OFFICE 1,965,909

AUTOMATIC TRAIN PIPE CONNECTER

Joseph Robinson, New York, N. Y., assignor of one-half to Roy M. Wolvin, Montreal, Quebec, Canada Application November 2, 1929, Serial No. 404,439
Renewed November 10, 1932

9 Claims. (Cl. 285—58)

My invention relates to automatic train pipe connecters and particularly to that type of connecter in which the pressure fluid carried is employed to advance the connecter head and force the joint between mated coupling heads into rigid engagement. My embodiment of this type of automatic train pipe connecter employs several novel features as will appear from the following description and the accompanying drawings in which Figure 1 is a side elevation of my improved connecter;

Figure 3 is an enlarged sectional detail through the cylinder and a part of the bracket;

Figure 4 is a front view on the line 4—4 of Figure 1, and

Figure 5 is a front elevation of the two-way hose nipple forming a part of my invention.

Figure 1:
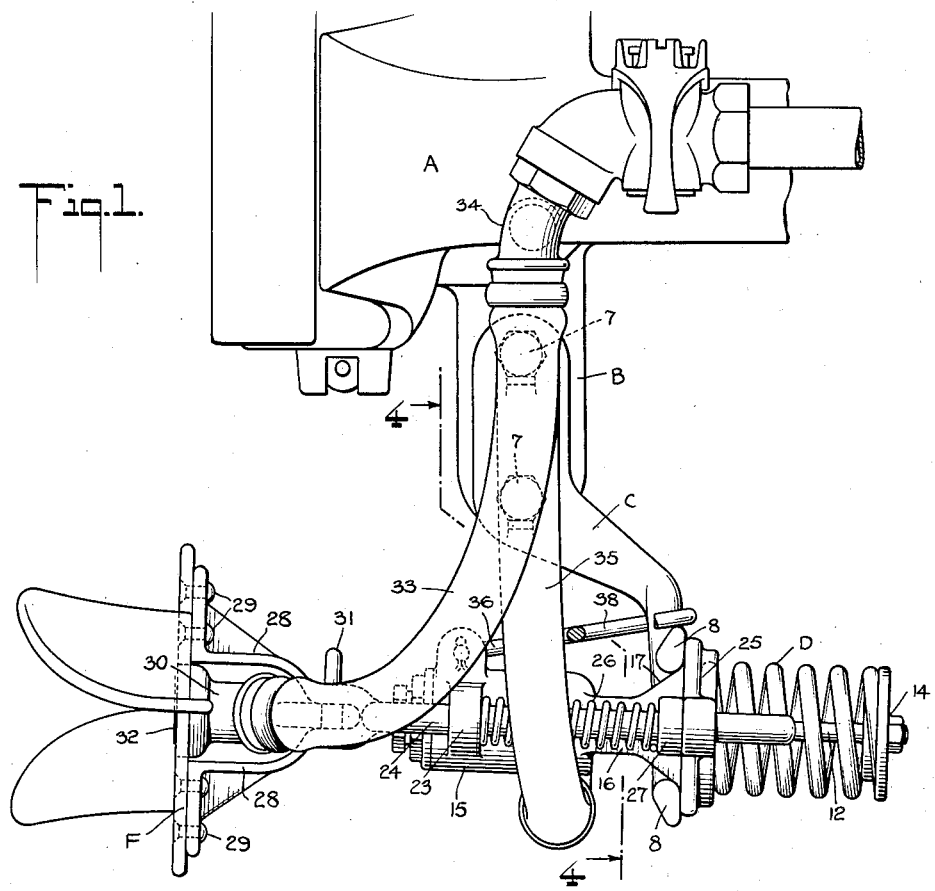
Figure 2:
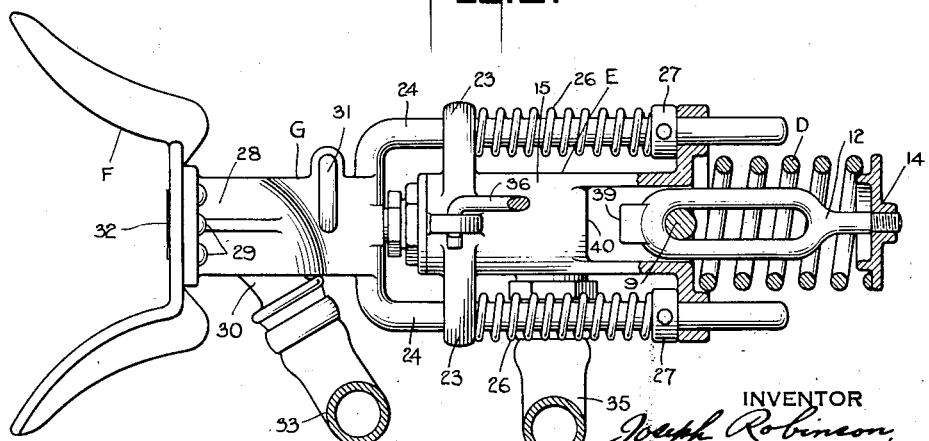
Figure 2 is a plane view thereof.

I preferably support my improved connecter from the underside of the car coupler A by means of a rigid lug B, but of course the connecter may be otherwise secured to the coupler if desired. A suitable bracket C spans the lug and is attached thereto by the bolts 7. At its lower end the bracket is provided with laterally extending projections or shoulders 8 between which, and preferably intergrally formed therewith, I provide a vertically disposed anchor device 9 which is offset midway of said shoulders to provide a seat 10 to receive pivotally the elongated perforated head 11 of the tie rod 12. The tie rod extends rearwardly of the bracket and is surrounded by a suitable spring D. An adjustable abutment 14 is mounted on the rear end of the tie rod to anchor the spring in place under any desired compression. A carrier or body E is provided for supporting and projecting the coupling head F forward of the bracket. This body comprises a tubular member or cylinder 15 the rear portion of which is provided with spaced members 16 that span the anchor device 9 of the bracket, and rest between the transversely extending shoulders 8. Inclined portions 17 formed on the straps 16 fit between these shoulders and prevent undue rotation of the body E and head F. Within the tubular member 15 I mount a piston H having a connecting rod 18 suitably packed as at 19. A suitable gasket or packing ring 20 of any desired material is anchored to the piston head by means of a nut 21 threaded to the connecting rod. Split rings 22 lie within grooves in the piston head as shown and tend constantly to keep the gasket 20 in tight engagement with the walls of the cylinder 15. On opposite sides the cylinder is provided with perforated ears 23 through which extend spaced prongs 24 of the yoke G. These prongs are preferably round in cross section and extend rearwardly through receiving openings in the flange 25 formed on the rear portion of the straps 16, which flange normally engages the rear side of the bracket C. The extent of projection of the prongs through the flange 25 is such that when the coupling head F is driven forward the prongs will not pass out of their engagement with the flange. Suitable coiled springs 26 surround the prongs between the flange and the ears 23. A collar 27 is mounted on each of the prongs and anchored thereto to retain the springs in position under the proper compression. The purpose of these springs is to hold the yoke G of my improvement rearwardly so that the face of the coupling head F will lie slightly in advance of the pulling face of the car coupler. Spaced portions 28, forming a part of the yoke, constitute seats for the coupling head F to which the head is rigidly anchored as by the rivets 29. A suitable conduit 30 is removably mounted between these portions and in the coupling head by means of a plunger pin 31. The conduit carries a gasket 32. The usual train pipe hose 33 is suitably connected to the conduit at its lower end and is connected at its upper end to a special two-way fitting 34, from one shank of which the hose 33 is secured and to the other shank of which the hose 35 is clamped. This latter hose is suitably connected at its lower end to an inlet of the cylinder 15. To cooperate with the spring in supporting the coupling head against downward movement I provide a supporting rod 36 which is suitably anchored to the member 15 as at 37, and which has a perforated elongated head 38 that embraces the bracket C, and normally rests just above the upper shoulder 8 on the bracket.

When opposing cars having my invention couple up the faces of the coupling heads F come into engagement slightly in advance of the final coupling operation. This brings the gaskets 32 into accurate alignment and firm contact. Further movement of the cars in the coupling operation shifts the connecter body (parts E and G) rearwardly against the tension of the buffer spring D until the seat or projection 39 on the front end of the tie rod 12 presses against the rear side of the cylinder 15 as at 40. This movement is preferably of sufficient extent to free the flange 25 of engagement with the rear side of the bracket C sufficiently that the connecter may move around the bracket into all positions required in service. Upon admission of the pressure fluid it, of course, enters the two hose 33 and 35. When it enters the cylinder 15 the piston H is of course pushed forward which firmly presses the coupling heads F into tighter engagement against the tension of the springs 26. If there should be considerable slack between the car couplers the pistons will shove the heads forward to compensate for it. When the couplers "run in", as in stopping the train, the connecter head will of course push the piston rearwardly against the pressure within the cylinder. During these movements of the coupling heads the cylinder continues to rest upon the seat 39 of the tie rod. When the cars are disconnected and the air gets out of the train line the springs draw the connecter head rearwardly, at the same time pulling the piston H rearwardly in the cylinder until the coupling head face lies slightly in advance of the pulling face of the coupler. The tension of the buffer spring D is at this time also released so that it shoves the cylinder 15 forward until the flange 25 is again in firm engagement with the rear side of the bracket. The spring cooperates with the rod 36 to yieldingly support the cylinder 15 and the coupling head F.

I am aware that modifications of my invention, as for instance placing the cylinder 15 behind the bracket C, may be made without departing from its cope. I therefore ask not to be limited to the exact construction disclosed.

What I claim is:

1. An automatic train pipe connecter comprising in combination, a coupling head and means for supporting the head on a fixed part of the car, said supporting means comprising two members, fluid actuated means for forcing one of said members forwardly and a spring for yieldingly pressing the other member against said fixed part of the car.

2. An automatic train pipe connecter in which the face of the coupling head lies only slightly in advance of the pulling face of the car coupler, the combination of a bracket for supporting the head, means connecting the head and the bracket, a spring at the rear of the bracket for yieldingly sustaining the head and said means, and fluid actuated mechanism between the bracket and the head for forcing the head forwardly considerably beyond the pulling face of the coupler to adjust the head to the running in and out movement of connected car couplers in service.

3. An automatic train pipe connecter comprising in combination, a coupling head, a bracket for supporting the head, means connecting the head and the bracket, said means including a cylinder, a yoke spanning the cylinder and anchored to the coupling head, a piston within the cylinder and provided with a connecting rod which engages said yoke to shift the yoke forward relative to the cylinder when the fluid pressure is on, and means engaging said cylinder and said bracket for flexibly sustaining said member on the bracket.

4. An automatic train pipe connecter comprising in combination, a coupling head, a bracket for supporting the head, a member extending from the head rearwardly and spanning said bracket, a spring engaging the rear end of said member and tending normally to press the member against the bracket, a tie rod hooked around the bracket for anchoring the spring in position, and fluid actuated means carried by said member between the bracket and the coupling head for shifting the head from its normal position just in advance of the pulling face of the coupler to various positions considerably in advance thereof.

5. An automatic train pipe connecter comprising a coupling head, a bracket, means for supporting said head on the bracket, said means comprising two members, one of said members including a cylinder and the other including a piston arranged in said cylinder, one of said members being connected to said head and the other extending rearwardly and having a part for engaging said bracket, a spring for pressing said part against the bracket, and a conduit for admitting pressure fluid to said cylinder.

6. Means for yieldingly supporting an automatic train pipe connecter head from a fixed part of a railway car, said means comprising a carrier pivotally engaging said fixed part and having a rear member and a front member to the latter of which said head is connected, a spring yieldingly supporting said rear member on the fixed part of the car, and fluid actuated means for forcing said front member forwardly relative to said rear member.

7. In an automatic train pipe connecter, the combination of a car coupler and a bracket rigidly secured thereto, a carrier pivotally connected to said bracket, a spring for yieldingly supporting said carrier on said bracket, said carrier comprising a rear part and a front part, a connecter head mounted on said front part, one of said parts having a cylinder and the other having a piston therein, and means for admitting pressure fluid to said cylinder to force said front part and said connecter head forwardly relative to the car coupler.

8. In an automatic train pipe connecter, in combination, a car coupler, a bracket rigidly secured thereto, a connecter head, a carrier to which said head is secured, said carrier comprising a rear part pivotally supported on said bracket and a front part connected to the head, a spring arranged to yieldingly force said rear part of the carrier forwardly toward the bracket, said rear part of the carrier including a cylinder, a piston in said cylinder, said piston being connected to the front part of said carrier, and means for introducing pressure fluid to said cylinder to force said piston and connecter head forwardly relative to the car coupler.

9. A construction as specified in claim 8 including a spring for yieldingly resisting the forward movement of the front part of said carrier relative to the rear part thereof.

JOSEPH ROBINSON.